United States Patent
Abernathy et al.

(10) Patent No.: US 9,475,239 B2
(45) Date of Patent: Oct. 25, 2016

(54) CABLES WITH EXTRUDED ACCESS FEATURES AND METHODS OF MAKING THEREOF

(71) Applicant: Corning Cable Systems LLC, Hickory, NC (US)

(72) Inventors: George Cornelius Abernathy, Hildebran, NC (US); David Wesley Chiasson, Edmonton (CA); Radawan Ripumaree, Granite Falls, NC (US); Alvin John McDonald, Rutherford College, NC (US); Randall Dwaine Tuttle, Conover, NC (US)

(73) Assignee: CORNING CABLE SYSTEMS LLC, Hickory, NC (US)

(*) Notice: Subject to any disclaimer, the term of this patent is extended or adjusted under 35 U.S.C. 154(b) by 349 days.

(21) Appl. No.: 13/661,482

(22) Filed: Oct. 26, 2012

(65) Prior Publication Data
US 2013/0108228 A1    May 2, 2013

Related U.S. Application Data

(60) Provisional application No. 61/554,258, filed on Nov. 1, 2011.

(51) Int. Cl.
| | |
|---|---|
| *G02B 6/44* | (2006.01) |
| *B29D 11/00* | (2006.01) |
| *B29C 47/00* | (2006.01) |
| *B29C 47/02* | (2006.01) |
| *B29C 47/04* | (2006.01) |
| *B29L 11/00* | (2006.01) |

(52) U.S. Cl.
CPC ..... *B29D 11/00663* (2013.01); *B29C 47/0016* (2013.01); *B29C 47/0021* (2013.01); *B29C 47/025* (2013.01); *B29C 47/027* (2013.01); *B29C 47/04* (2013.01); *G02B 6/4433* (2013.01); *B29L 2011/0075* (2013.01); *G02B 6/4484* (2013.01); *G02B 6/4486* (2013.01); *G02B 6/4495* (2013.01)

(58) Field of Classification Search
None
See application file for complete search history.

(56) References Cited

U.S. PATENT DOCUMENTS

| | | |
|---|---|---|
| 4,976,519 A | 12/1990 | Davey et al. |
| 5,062,685 A | 11/1991 | Cain et al. |
| 5,355,429 A | 10/1994 | Lee et al. |
| RE35,935 E | 10/1998 | Cabato et al. |
| 7,391,943 B2 | 6/2008 | Blazer et al. |
| 7,391,944 B2 | 6/2008 | Storaasli et al. |
| 7,463,803 B2 | 12/2008 | Cody et al. |
| 7,539,380 B1 | 5/2009 | Abernathy et al. |
| 7,567,741 B2 | 7/2009 | Abernathy et al. |
| 8,538,216 B2 | 9/2013 | Abernathy et al. |
| 8,582,940 B2 | 11/2013 | Abernathy et al. |
| 8,649,644 B2 | 2/2014 | Greenwood, III et al. |
| 8,738,878 B2 | 5/2014 | Ju |
| 9,073,243 B2 | 7/2015 | Gimblet et al. |
| 9,176,293 B2 | 11/2015 | Navé |
| 9,201,208 B2 | 12/2015 | Gimblet et al. |
| 9,274,302 B2 | 3/2016 | Gimblet et al. |

(Continued)

*Primary Examiner* — Tina Wong
(74) *Attorney, Agent, or Firm* — William D. Doyle

(57) ABSTRACT

Cables are constructed a jacket having an inner section within the cable jacket that facilitates access to the cable core, and which can be removed at the end of the cable during connectorization. The inner section is removed at the end of the cable to create a cavity in which fiber(s) in the cable core can buckle during connectorization to reduce strain on the fibers.

19 Claims, 12 Drawing Sheets

(56) References Cited

U.S. PATENT DOCUMENTS

| | | |
|---|---|---|
| 9,323,022 B2 | 4/2016 | Bringuier et al. |
| 2007/0098339 A1 | 5/2007 | Bringuier et al. |
| 2009/0003779 A1* | 1/2009 | Parris .......................... 385/103 |
| 2009/0087148 A1* | 4/2009 | Bradley et al. ................ 385/76 |
| 2010/0135624 A1* | 6/2010 | Overton et al. ............... 385/102 |
| 2010/0150505 A1* | 6/2010 | Testu et al. ................... 385/109 |
| 2010/0290747 A1 | 11/2010 | Bringuier et al. |
| 2011/0229098 A1 | 9/2011 | Abernathy et al. |
| 2013/0089332 A1 | 4/2013 | Sauer et al. |
| 2013/0108228 A1 | 5/2013 | Abernathy et al. |

* cited by examiner

CABLES WITH EXTRUDED ACCESS FEATURES AND METHODS OF MAKING THEREOF

RELATED APPLICATIONS

This application claims the benefit of U.S. Provisional Application No. 61/554,258 filed Nov. 1, 2011, which is incorporated by reference herein in its entirety.

BACKGROUND

Existing small cross-sections drop cable designs include tight cable constructions where the fibers/ribbons are adjacent to and abut the jacketing material. Such cables have coupling of the fiber to the cable structure while also maintaining the waterblocking attribute of the cable. During connectorization, however, the fiber needs to buckle within the cable or in the connector body to reduce the fiber stress within the connector assembly. Specifically, as the connector is engaged, spring-loaded ferrules containing the fiber's ends make contact, causing the ferrule within the connector housing to move relative to the housing. Tight cable constructions lack room for buckling in the cable during that relative movement, so the connector must have an additional connector cavity section to accommodate longitudinal and lateral fiber movements.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the invention.

DETAILED DESCRIPTION

Figure 1:
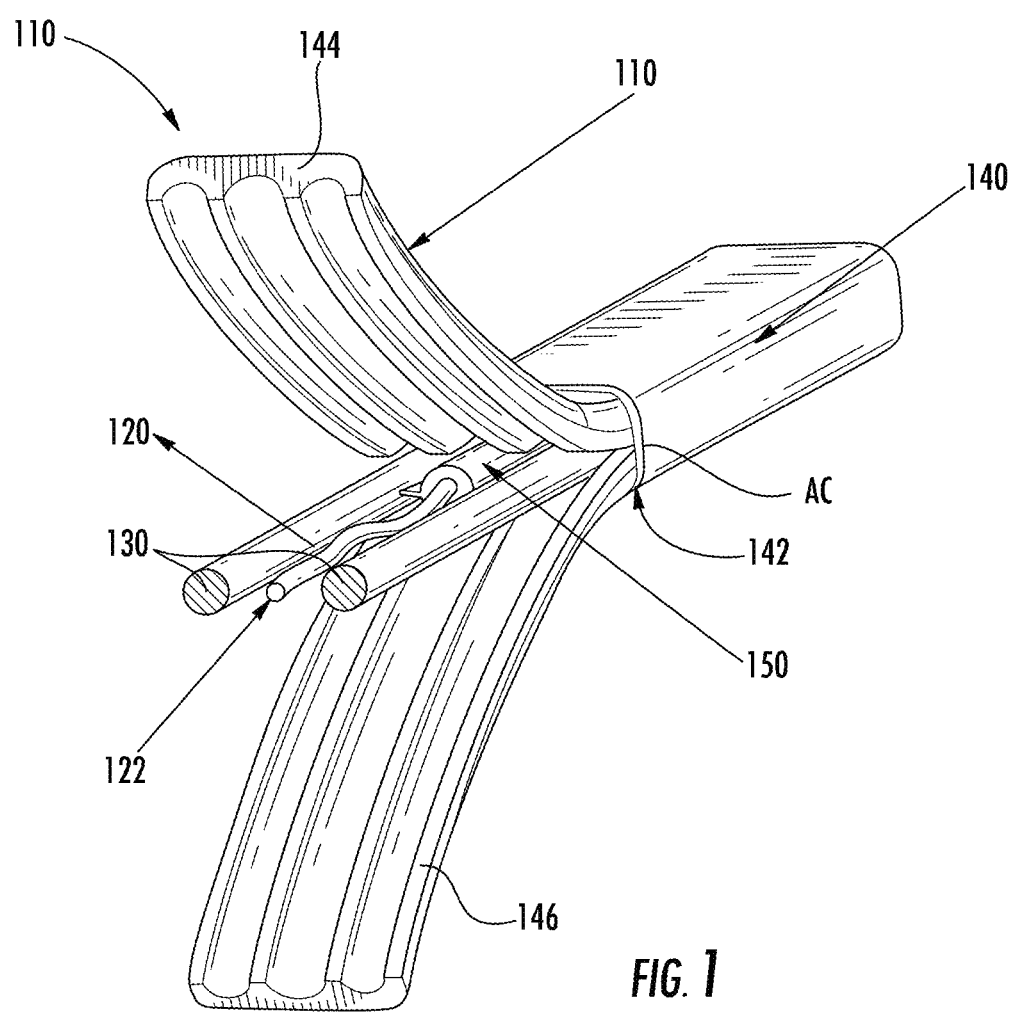
FIG. 1 is a partial cutaway view of a fiber optic cable with jacket sections being removed according to a first embodiment.
Figure 2:
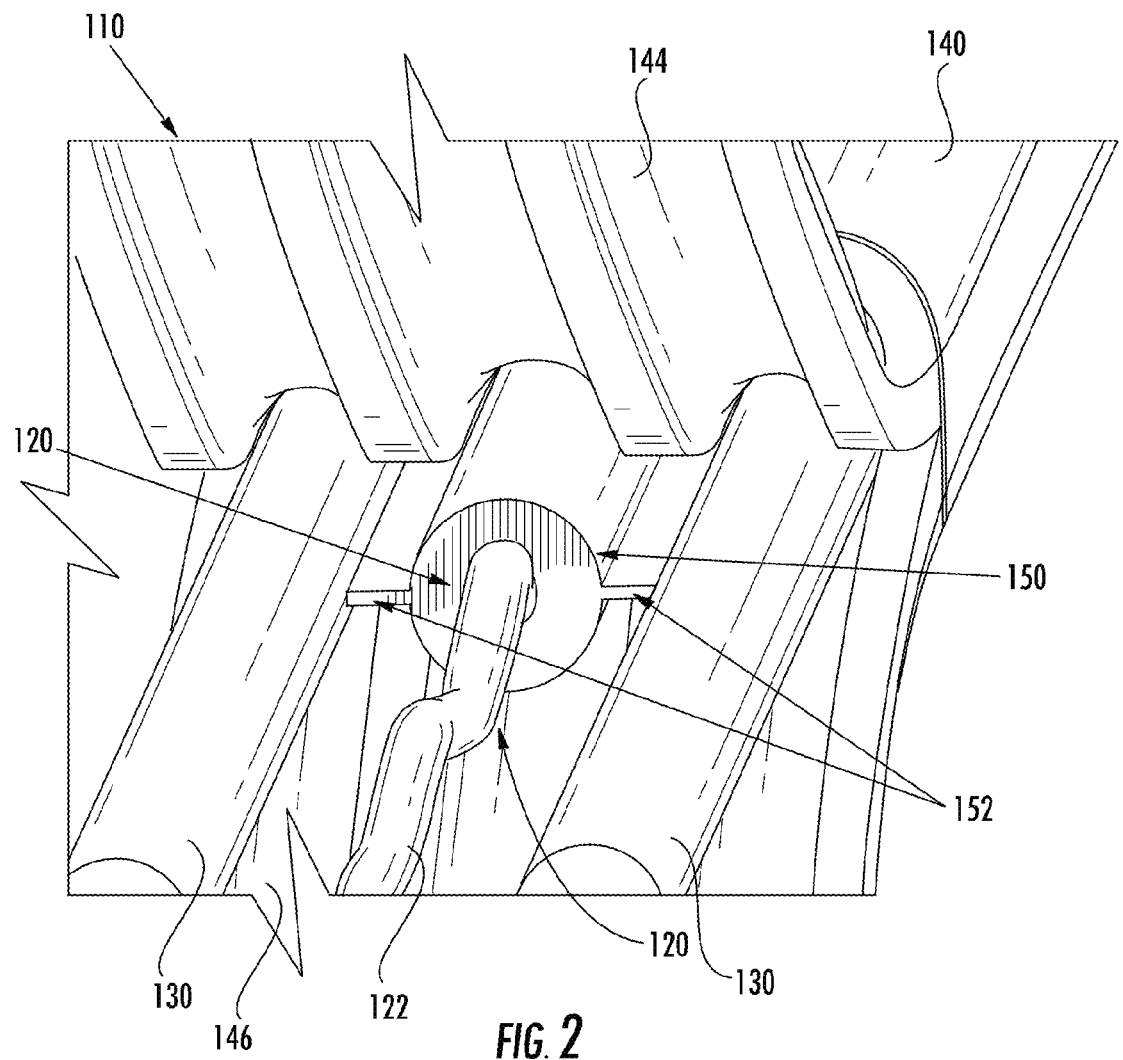
FIG. 2 is an isolated view of the core portion of the cable of FIG. 1.

FIG. 1 is a perspective view of a fiber optic cable 110 according to a first embodiment in which the cable jacket is separated according to a step in the connectorization process. FIG. 2 is an isolated view of the cable during that process in the vicinity of the cable core. Referring to FIGS. 1 and 2, the cable 110 has an optically conductive core 120, a first and a second strength component 130, a cable jacket 140, and an inner section 150 surrounding the core 120. The first and second strength components 130 are disposed on opposite sides of the core 120. The core 120 can comprise, for example, one or more optical fibers 122. In the illustrated embodiment, the core 120 is a single optical fiber 122 in a tight cable construction, with the proximity and tightness of inner section 150 about the core 120 providing coupling for the fiber 122. The core 120 has an axial centerline (not illustrated) located at the center of its cross-section that may be generally aligned with the axial centerlines of the strength components 130 along a common plane. The orientation of the strength components 130 on the common plane in part provides preferential bend characteristics to the fiber optic cable 110. The axial centerlines of the core 120 or fibers in the cable 110 need not be exactly aligned with the plane passing through the axial centerlines of the strength components 130, and may move off of the plane, e.g. "up" and "down", with respect to the strength components 130 along the length of the cable 110. For the purposes of this specification, when the fiber or fibers of a cable are said to be "generally aligned with" or "aligned with" a plane passing through two strength components in a tight cable construction, it is understood that the fiber may be slightly offset from that plane, for example, by 0.5 millimeters in either direction. The jacket 140 and the inner section 150 can be formed primarily from extruded polymer materials, and can be generally referred to as "polymeric." In this specification, the term "polymer" and "polymeric" include materials such as, for examples, copolymers, and polymer materials including additives such as fillers. In the exemplary embodiment, the cable jacket 140 envelops and contacts the inner section 150, and the inner section envelops and may contact the core 120. The cable jacket 140 may also envelop and contact both strength components 130.

According to one aspect of the present embodiments, the inclusion of the inner section 150 in the jacket 140 addresses deficiencies of conventional tight cable designs in providing for fiber buckling during connector engagement. According to this aspect, a portion of the inner section 150 can be easily removed prior to connectorization to allow for, for example, slack in the optical fiber core 120 at the exposed end of the cable. According to another aspect, the inner section 150 can be of a material that is softer, or, of lower modulus of elasticity, than the jacket 140. The relatively low modulus material reduces strains transferred to the core 120 to reduce delta attenuation in the fiber 122. Other advantages associated with the inner section 150 are described below.

FIGS. 1 and 2 illustrate the cable 110 with the jacket 140 split on either side of the core 120. The jacket 140 can be split in this manner by, for example, shaving the sides at locations 142. Due to the shape and low adhesion (or cohesion) of the inner section 150, the jacket 140 can be relatively easily separated as shown in FIGS. 1 and 2. Referring to FIG. 2, the inner section 150 can include extensions 152 that extend to contact or adjacent to the strength members 130 to further facilitate splitting of the jacket 140. A selected length of the exposed inner section 150 can then be removed from around the core 120.

Figure 3:
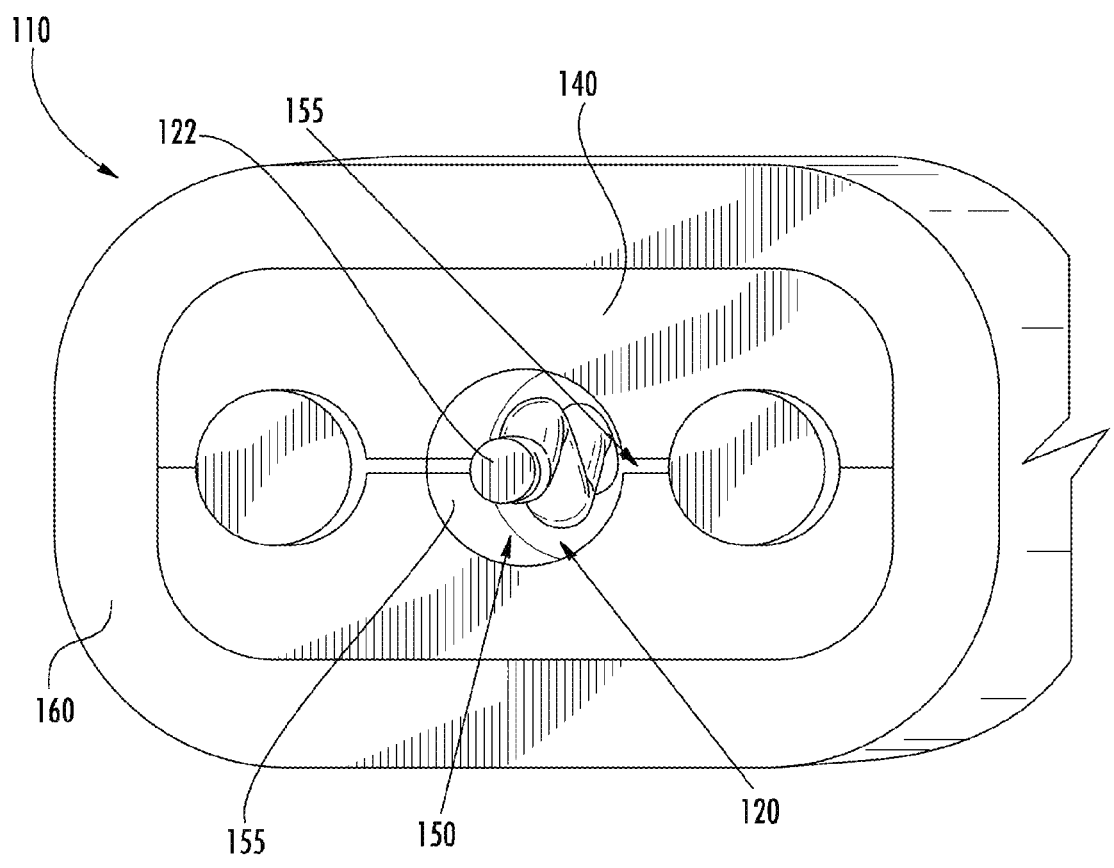
FIG. 3 is a view of the end of the cable of FIG. 1 with a structure secured to the cable end.
Figure 4:
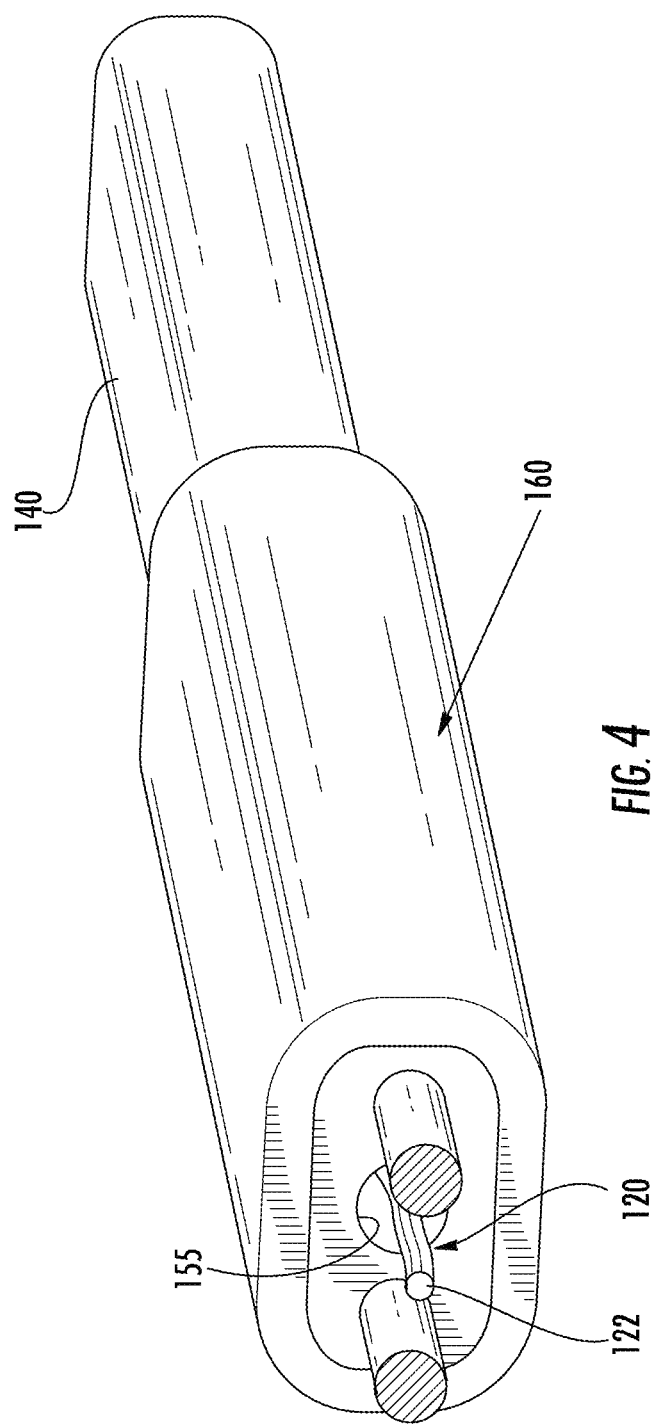
FIG. 4 is a view of the cable of FIG. 1 with a structure secured to the cable end and the construct prepared to receive a connector.

Referring to FIGS. 3 and 4, with a selected length of the inner section 150 removed from the end of the core 120, the jacket halves 144, 146 can be reassembled with the use of a suitable bonding technique, and a structure 160 placed over the end of the cable. The structure 160 can be formed from elements such as, for example, tape and overmolded plastic, to bind the two halves 144, 146 of the jacket 140. To increase the adhesion between the jacket sections, the butt ends of the jacket section profiles can be beveled to allow for an overmolded plastic the adequately fill the joint(s).

The absence of the inner section 150 creates a cavity 155 at the cable's end that allows the fiber(s) 122 in the core 120 to buckle, and isolates strain on the fiber(s) in the core from the location of the cable strain. The continuity of the strength members is also maintained. The resultant cable construction is a tight construction for the cable length except where the inner section 150 has been removed so that core 120 remains coupled to the cable.

This cable construction has the advantage of being a tight construction, which has a lower cost than larger cables with an interior cavity. The removable inner section 150 allows the core 120 to be easily decoupled from the cable near the connector, as well as minimizing connector assembly complexity and connector assembly manufacturing time. If the cavity 155 is below a predetermined length, for example one meter, waterblocking materials need not be provided in the cavity. In any case, some waterblocking material can be easily inserted during the reassembly of the cable. If desired, modifications to the strength members 130 can be made during the cable dissection/reassembly whereby strength members 130 are shaved and their cross sections reduced. This creates a less rigid cable section near the connector, while maintaining strength member continuity up to the connector.

The material of the inner section 150 can be selected so as to provide a relatively low bond with the jacket 140, and to provide a tight construction around the core 120 that still reduces strains on the fiber(s) in the core 120. In general, this can be accomplished by using a material that provides a low adhesion to the jacket 140. According to one aspect, the adhesion of the inner section 150 to the jacket 140 can be on the order of 50% less than that of the cohesive strength of the jacket 140. Adhesive and cohesive strengths are typically measure in units of force per area, such as MPa. The inner section 150 can be, for example, a thermoplastic material such as polypropylene. However, to facilitate the easy removal of the inner section 150 from the fiber 122, the cohesive strength of section 150 can be 10% or less of the cohesive strength of the jacket 140. The lack of cohesive strength within the inner section 150 may allow for a greater adhesion ratio than stated above due to the fact that the 150 material will fail cohesively thus exposing the fiber. In this case, the inner section 150 is removed from the jacket 140 and not the fiber 122. The jacket 140 can be formed from polyethylene materials such as, for example, medium density polyethylene (MDPE), polyvinylchloride (PVC). Thermoplastic Elastomer (TPE).

In the exemplary embodiment, the inner section 150 is bonded to a desired degree to the jacket 140 when the jacket is extruded. The jacket 140 and the inner section 150 can be formed from extrudable polymers, so that as the extrudates used to form the jacket 140 and the inner section 150 cool and solidify, the extrudates become bonded to a desired degree. The degree of bonding may be small so as to facilitate jacket separation as shown in FIGS. 1 and 2. The degree of bonding between the jacket 140 and the material within the inner section 150 and the shape of the inner section 150 can be selected to provide desirable jacket separation properties at the inner section 150. The jacket 140 can accordingly comprise a cohesive, unitary, composite polymeric structure.

The cross-sectional footprint, or cross-sectional area, of the fiber optic cable 110 may be substantially smaller than the cross-sectional footprints of conventional fiber optic cables of the same type. The area of the cross-sectional footprint may be less than about 25 millimeters squared, for example. According to one aspect, the cross-sectional footprint can be similar or identical to the cables disclosed in U.S. Pat. No. 7,539,380, U.S. Pub 20110229098, and PCT/US2009/058017, the entire contents of which are hereby incorporated by reference. The presence of the inner section 150, and the cushioning effect it has on the core, however, may lessen the need to shape the jacket to transfer compressive loads to the strength members 130 so that the upper and lower surfaces of the jacket 140 can be flat. In general, the cables have a width and a height, the width being at least 1.5 times the height of the cable. As shown in FIGS. 1 and 2, the inner section 150 may occupy relatively substantial portion of the cable cross-sectional area AC. For example, the inner section 150 can have a cross-sectional area that is at least 10% of AC, and further at least 20% of AC. The jacket 140 may tightly conform to and/or be bonded to the exterior of the inner section 150 where the two elements abut. The inner section 150 can in turn relatively tightly confine the core 120 within, so that the core 120 can contact the interior of the inner section along the length of the cable.

FIG. 4 illustrates the cable 110 with the jacket halves recombined to form a cable section with a hollow cavity 155 enclosing the fiber 120 within. The end of the component, which can be referred to as a 'demarc', is now ready to receive a connector (not shown).

Figure 5:
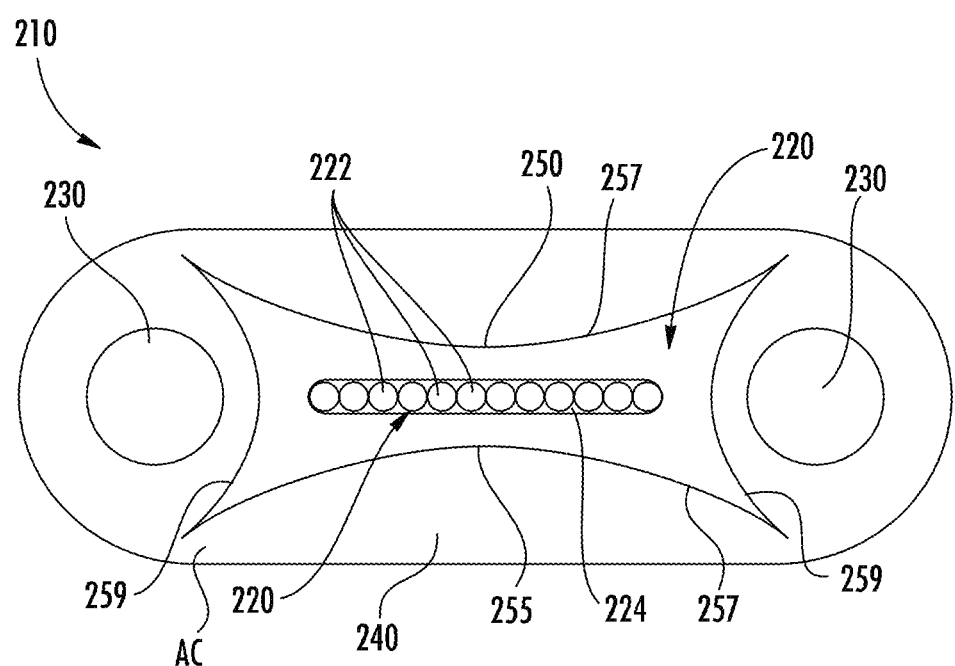
FIG. 5 is a cross-sectional view of a cable according to a second embodiment.

FIG. 5 is a cross-sectional view of a cable 210 according to a second embodiment. The cable 210 has a core 220 of twelve optical fibers 222 formed into an optical fiber ribbon 224, located between strength members 230. The ribbon 224 is wholly embedded in an inner section 250, and the inner section 250 is wholly embedded in and continuous with the jacket 240. The inner section 250 has concave upper and lower surfaces 257, and concave end surfaces 259. The inner section occupies at least 20% of the cable cross-sectional area AC. The strength members 230 are wholly embedded in the jacket 240 and do not contact the inner section 250.

Figure 6:
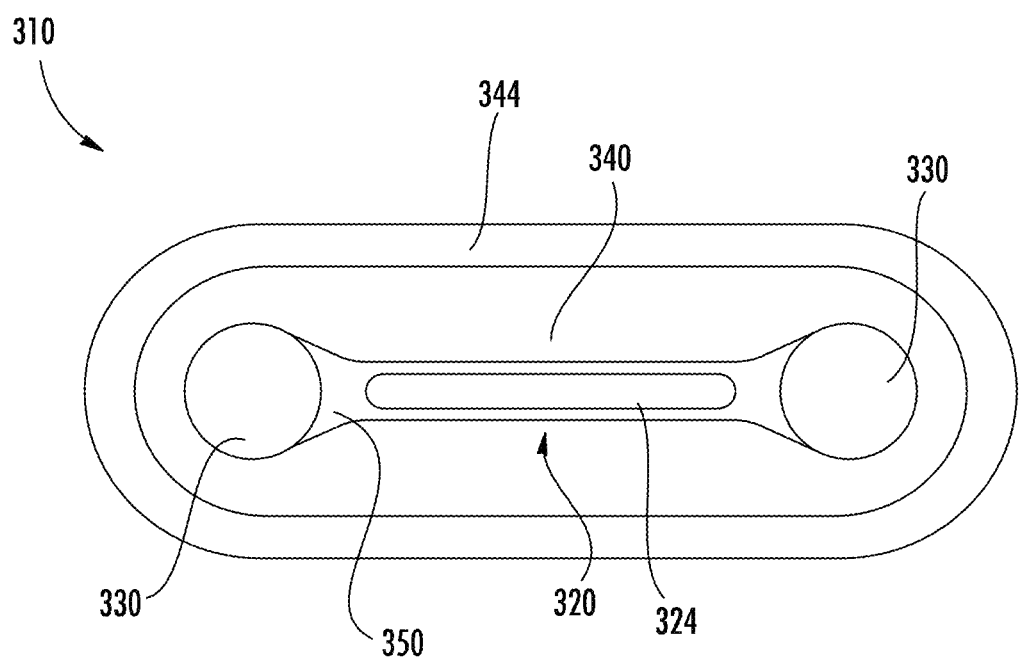
FIG. 6 is a cross-sectional view of a cable according to a third embodiment.

FIG. 6 is a cross-sectional view of a cable 310 according to a third embodiment. The cable 310 has a core 320 of twelve optical fibers 322 formed into an optical fiber ribbon 324, located between strength members 330. The ribbon 324 is wholly embedded in an inner section 350, and the inner section 350 is wholly embedded in the jacket 340. The jacket 340 includes an exterior nylon coating layer 344. The strength members 330 are substantially embedded in the jacket 340 and contact the inner section 350.

Figure 7:
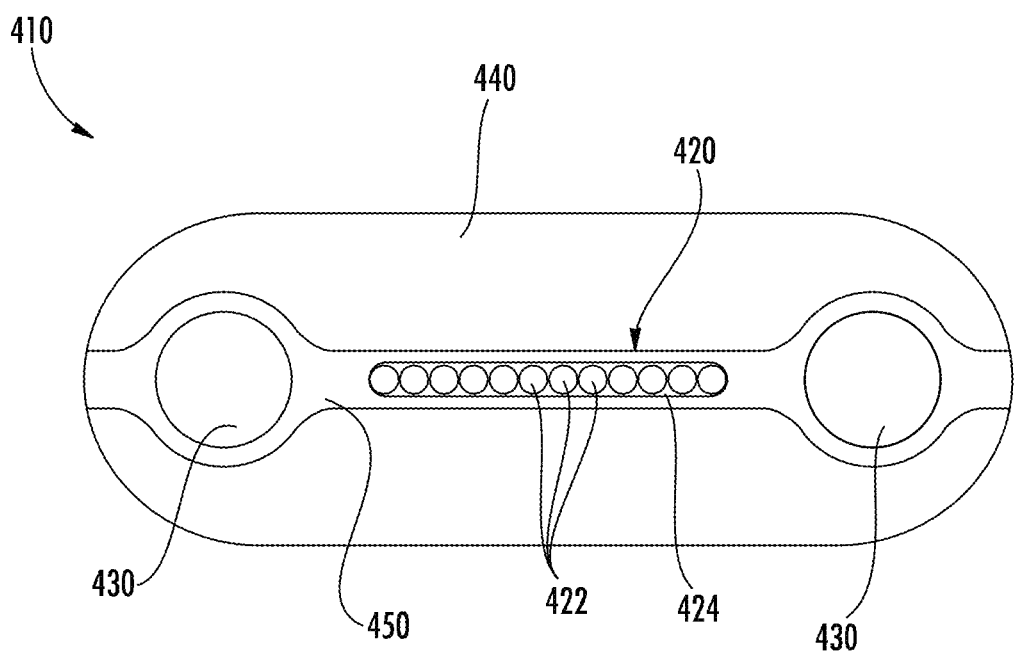
FIG. 7 is a cross-sectional view of a cable according to a fourth embodiment.

FIG. 7 is a cross-sectional view of a cable 410 according to a fourth embodiment. The cable 410 has a core 420 of twelve optical fibers 422 formed into an optical fiber ribbon 424, located between strength members 430. The ribbon 424 is wholly embedded in an inner section 450. The inner section 450 is substantially embedded in the jacket 440, with end portions of the inner section 450 extending to the cable 410 exterior. The strength members 430 are wholly embedded in the inner section 450 and do not contact the jacket 440.

Figure 8:
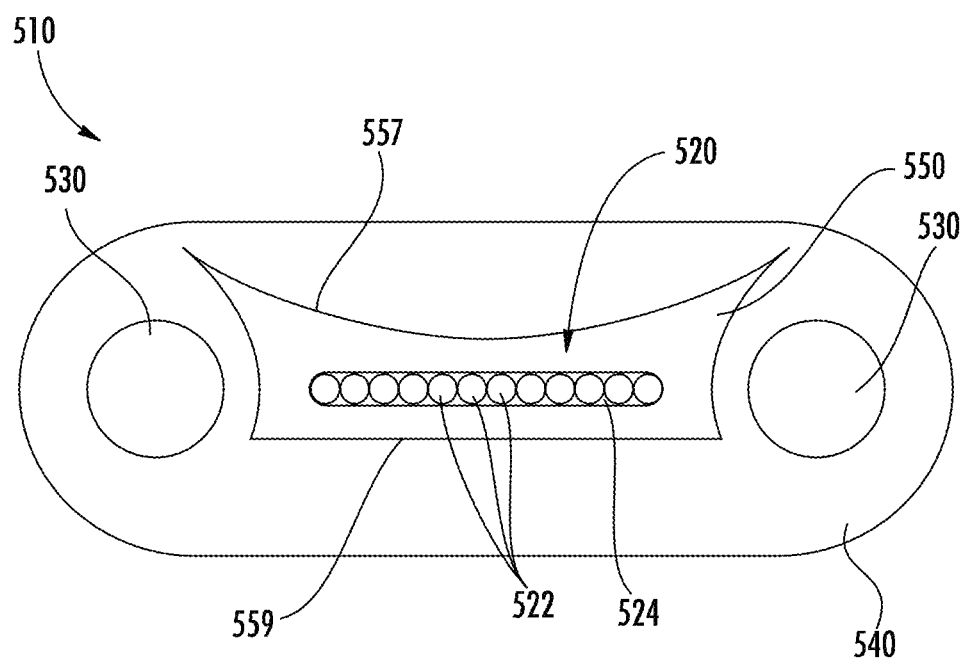
FIG. 8 is a cross-sectional view of a cable according to a fifth embodiment.

FIG. 8 is a cross-sectional view of a cable 510 according to a fifth embodiment. The cable 510 has a core 520 of twelve optical fibers 522 formed into an optical fiber ribbon 524, located between strength members 530. The ribbon 524 is wholly embedded in an inner section 550, and the inner section 550 is wholly embedded in the jacket 540. The inner section 550 has a concave upper surface 557 and a generally flat opposite surface 559. The strength members 530 are wholly embedded in the jacket 540 and do not contact the inner section 550.

Figure 9:
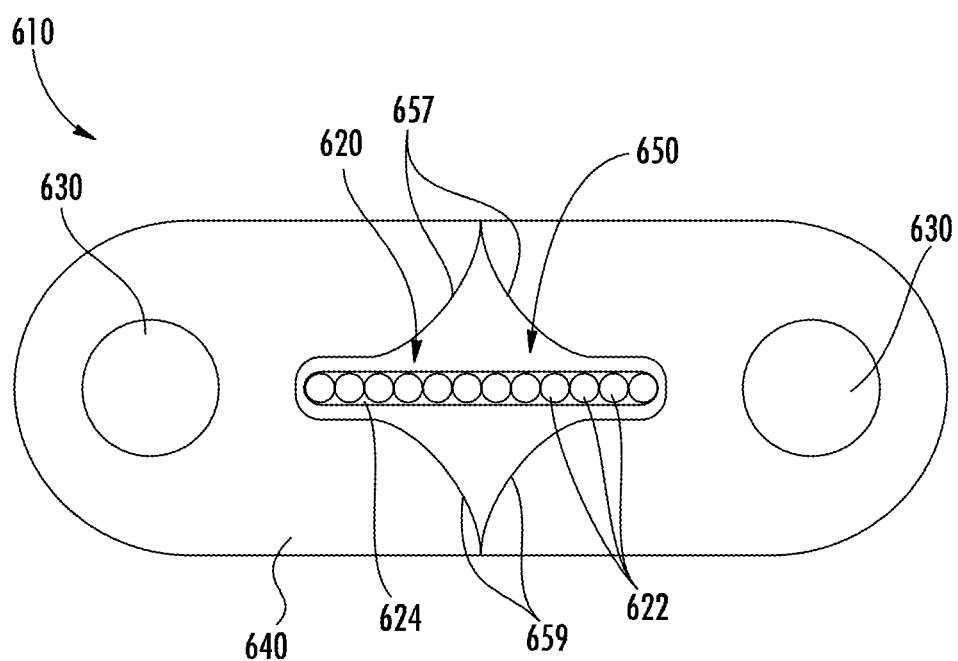
FIG. 9 is a cross-sectional view of a cable according to a sixth embodiment.

FIG. 9 is a cross-sectional view of a cable 610 according to a sixth embodiment. The cable 610 has a core 620 of twelve optical fibers 622 formed into an optical fiber ribbon 624, located between strength members 630. The ribbon 624 is wholly embedded in an inner section 650. The inner section 650 is substantially embedded in the jacket 640, but a point of the inner section 650 may extend to upper and lower surfaces of the jacket 640. This arrangement allows the jacket 640 to be separated along a vertical centerline through the cable. The inner section 650 has a pair of concave upper surfaces 657 and a pair of concave lower surfaces 659. The strength members 630 are wholly embedded in the jacket 640 and do not contact the inner section 250. This profile will facilitate the splitting of the jacket in a vertical plane bisecting the cable profile.

Figure 10:
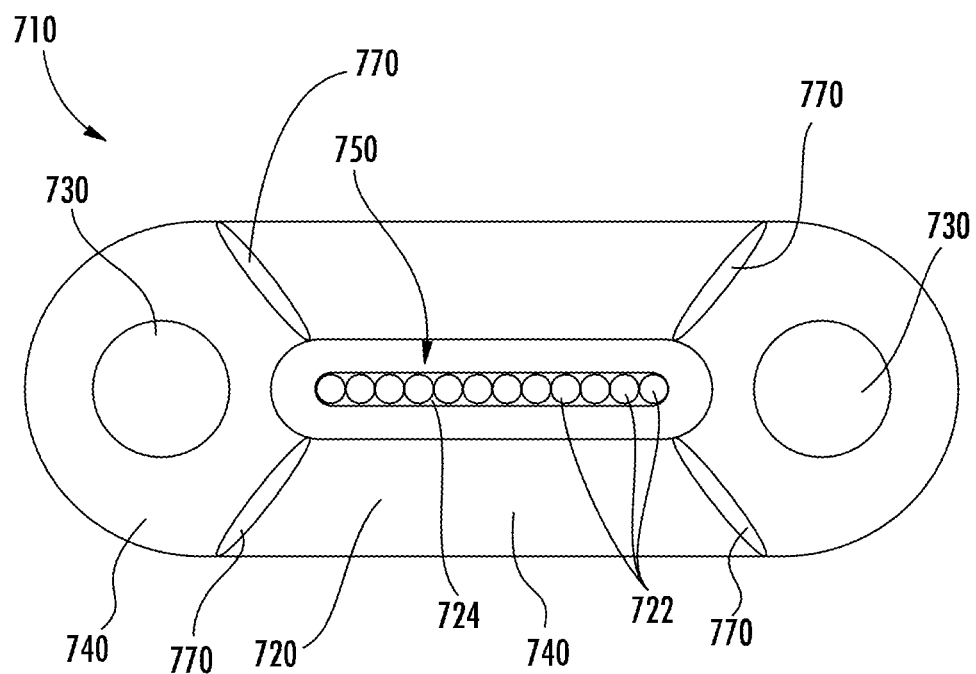
FIG. 10 is a cross-sectional view of a cable according to a seventh embodiment.

FIG. 10 is a cross-sectional view of a cable 710 according to a seventh embodiment. The cable 710 has a core 720 of twelve optical fibers 722 formed into an optical fiber ribbon 724, located between strength members 730. The ribbon 724 is wholly embedded in an inner section 750, and the inner section 750 is wholly embedded in the jacket 740. The strength members 730 are substantially embedded in the jacket 740 and do not contact the inner section 750. The jacket 740 can include one or more access features 770 such as those disclosed in PCT/US11/34309, U.S. App. No. 61/407,744, U.S. App. No. 61/416,684, and U.S. App. No. 61/546,597, the entire contents of which are incorporated by reference. This profile will allow for a splitting of the cable jacket so that the surface area of the mating jacket surfaces is maximized.

Figure 11:
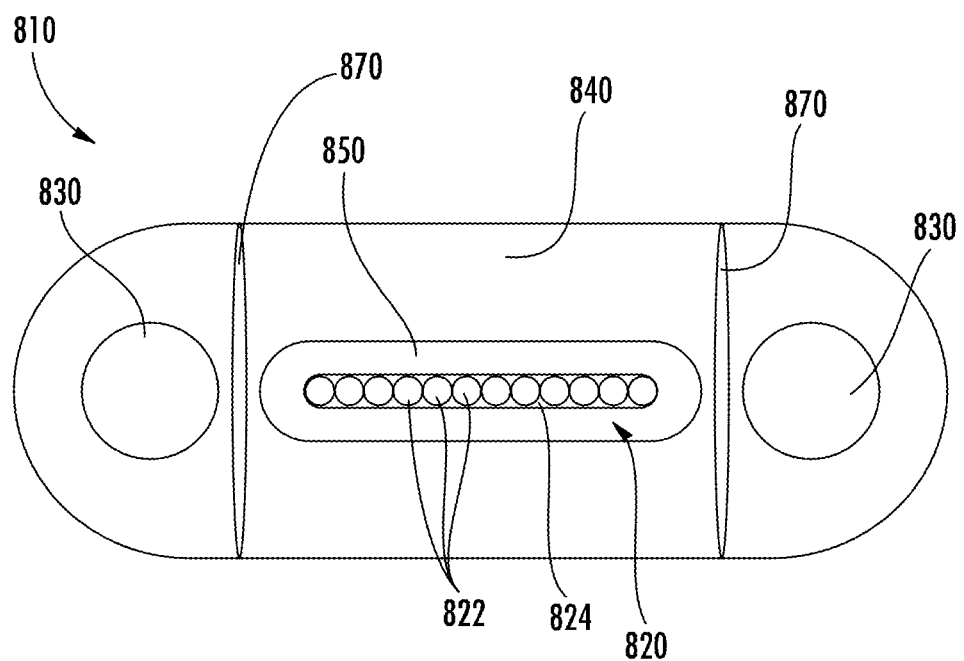
FIG. 11 is a cross-sectional view of a cable according to an eighth embodiment.

FIG. 11 is a cross-sectional view of a cable 810 according to an eighth embodiment. The cable 810 has a core 820 of twelve optical fibers 822 formed into an optical fiber ribbon 824, located between strength members 830. The ribbon 824 is wholly embedded in an inner section 850, and the inner section 850 is wholly embedded in the jacket 840. The strength members 830 are wholly embedded in the jacket 840 and do not contact the inner section 850. The jacket 840 can include one or more access feature 870 such as those disclosed in PCT/US11/34309, U.S. App. No. 61/407,744, U.S. App. No. 61/416,684, and U.S. App. No. 61/546,597, the entire contents of which are incorporated by reference.

Figure 12:
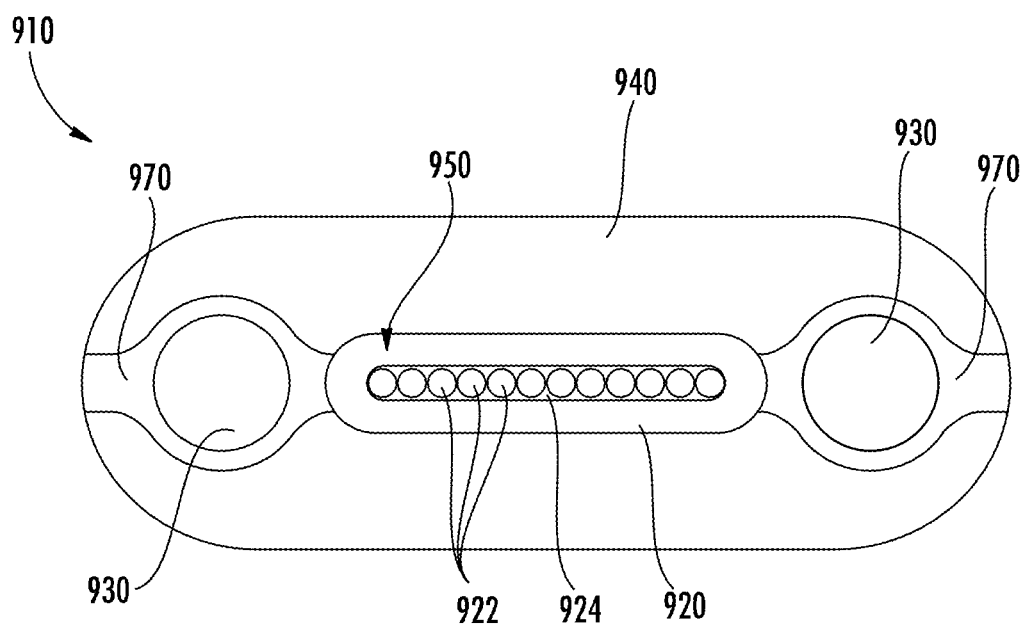
FIG. 12 is a cross-sectional view of a cable according to a ninth embodiment.

FIG. 12 is a cross-sectional view of a cable 910 according to a ninth embodiment. The cable 910 has a core 920 of twelve optical fibers 922 formed into an optical fiber ribbon 924, located between strength members 930. The ribbon 924 is wholly embedded in an inner section 950, and the inner section 950 is substantially embedded in the jacket 940 and contact access features 970 on either side of the inner section 950. The strength members 930 are substantially embedded in the access feature 970 and do not contact the inner section 950. The access feature 970 can be of similar composition and can be formed by coextrusion methods such as those disclosed in PCT/US11/34309, U.S. App. No. 61/407,744, U.S. App. No. 61/416,684, and U.S. App. No. 61/546,597. The shape and arrangement of the access features 970 are selected to provide access and cable separation at the strength members 930.

Subject matter disclosed in this application may be related to subject matter disclosed in U.S. Pat. No. 7,539,380, to U.S. application Ser. No. 12/258,121, to PCT/US2009/058017, to PCT/US2010/037377, PCT/US11/34309, filed Apr. 28, 2011, to PCT App. No. PCT/US11/57574, filed Oct. 25, 2011, U.S. Prov. App. No. 61/416,684, filed Nov. 23, 2010, U.S. Prov. App. No. 61/546,597, filed Oct. 13, 2011, to U.S. Prov. App. No. 61/546,694, filed Oct. 13, 2011, to U.S. Prov. App. No. 61/546,694, to U.S. Prov. App. No. 61/552,769, and to U.S. Pat. No. 7,391,943, issued Jun. 24, 2008, each of which is incorporated by reference herein in its entirety.

The terms "polymer" and "polymeric" as used in this specification indicate extrudable materials consisting primarily of polymers, including mixtures of polymers such as copolymers, but allows for the inclusion of filler materials, for example.

Many modifications and other embodiments, within the scope of the claims will be apparent to those skilled in the art. For instance, the concepts of the present invention can be used with any suitable fiber optic cable design and/or method of manufacture. Thus, it is intended that this invention covers these modifications and embodiments as well those also apparent to those skilled in the art.

What is claimed is:

1. A cable, comprising:
    a core comprising at least one optical fiber;
    an inner section at least partially surrounding the core, the inner section comprising a first polymeric material, an outer surface and an inner surface, the inner surface of the inner section contacting an outer surface of the core; and
    a jacket at least partially surrounding the inner section, the jacket comprising a second polymeric material extruded over the first material and an inner surface contacting the outer surface of the inner section;
    wherein a cross-sectional area of the inner section is at least 10% of a total cross-sectional area of the cable; and
    wherein an adhesive strength between the first polymeric material and the second polymeric material is less than 50% of a cohesive strength of the second polymeric material.

2. The cable of claim 1, further comprising a first strength member disposed on one side of the core and a second strength member disposed on a second side of the core.

3. The cable of claim 2, wherein the strength members are elongate rods at least partially embedded in the jacket such that the inner surface of the jacket contacts outer surfaces of both the first and second strength members.

4. The cable of claim 3, wherein the strength members are located on a plane that is generally aligned with a plane passing through the core.

5. The cable of claim 1, wherein the cable has a width and a height, the width being at least 1.5 times the height.

6. The cable of claim 1, wherein the core is wholly embedded in the inner section.

7. The cable of claim 6, wherein the inner section is at least partially embedded in the jacket and in intimate contact with the jacket.

8. The cable of claim 6, wherein the inner section is wholly embedded in the jacket.

9. The cable of claim 1, wherein the jacket is applied about the inner section by extruding the first polymeric material and the second polymeric material together in a single extrusion head.

10. The cable of claim 1, wherein the second polymeric material comprises a polyethylene.

11. The cable of claim 10, wherein the first polymeric material comprises a thermoplastic elastomer.

12. The cable of claim 1, further comprising a cavity surrounding the core and positioned between the core and the jacket, wherein the cavity results from removal of a portion of the inner section, and further wherein the first polymeric material has a lower modulus of elasticity than the second polymeric material.

13. The cable of claim 1, wherein a cross-sectional area of the inner section is at least 20% of a total cross-sectional area of the cable.

14. The cable of claim 1, further comprising at least one access feature formed in the jacket from a third material.

15. The cable of claim 14, wherein the third material comprises polypropylene.

16. A cable, comprising:
a core comprising at least one optical fiber;
an inner section at least partially surrounding the core, the inner section comprising a first polymeric material; and
a jacket at least partially surrounding the inner section, the jacket comprising a second polymeric material over the first polymeric material,
wherein an adhesive strength between the first polymeric material and the second polymeric material is less than 50% of a cohesive strength of the second polymeric material, and
wherein a cross-sectional area of the inner section is at least 20% of a total cross-sectional area cable.

17. The cable of claim 16, wherein the second polymeric material comprises a polyethylene, and wherein the first polymeric material comprises a thermoplastic elastomer.

18. The cable of claim 17, further comprising at least one access feature formed in the jacket from a third polymeric material, wherein the third polymeric material comprises polypropylene.

19. A method of manufacturing a cable, comprising:
extruding a first polymeric material and a second polymeric material together in a single extrusion head to form a jacket about an inner section, wherein the inner section includes an outer surface contacting an inner surface of the jacket,
wherein the inner section is at least partially surrounding a core and the inner section includes an inner surface contacting an outer surface of the core, wherein the core comprises at least one optical fiber;
wherein the inner section comprises the first polymeric material; and the jacket comprises the second polymeric material, wherein a cross-sectional area of the inner section is at least 10% of a total cross-sectional area of the cable; and
wherein an adhesive strength between the first polymeric material and the second polymeric material is less than 50% of a cohesive strength of the second polymeric material, wherein the first polymeric material has a lower modulus of elasticity than the second polymeric material, and further wherein a cross-sectional area of the inner section is at least 20% of a total cross-sectional area of the cable.

* * * * *